Figure 1:
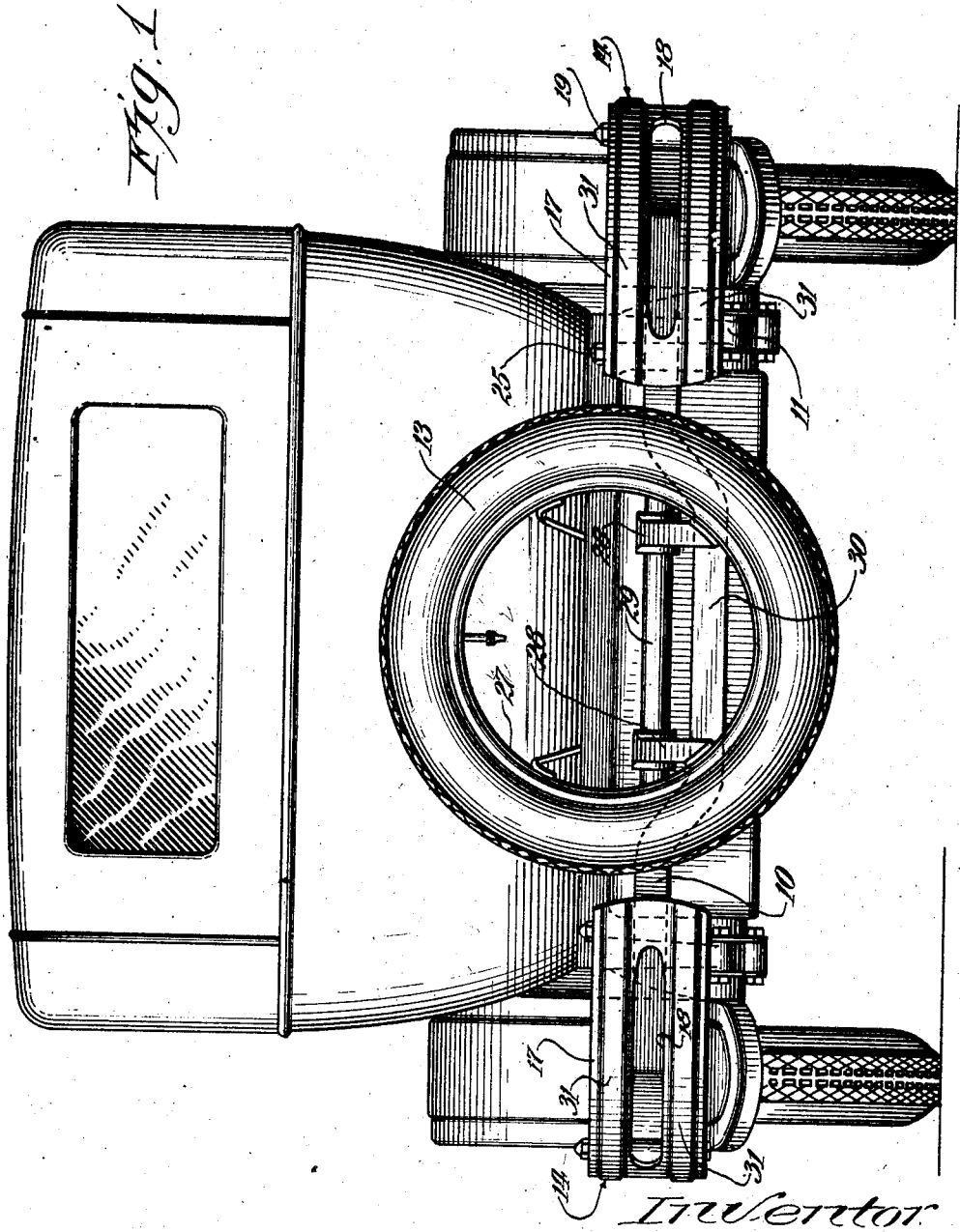

Aug. 3, 1926.

H. W. TINKER 1,594,580

BUMPER STRUCTURE FOR VEHICLES

Filed Nov. 6, 1925   2 Sheets-Sheet 1

Inventor
Herbert W. Tinker
By Rector, Hibben, Davis and Macauley
Attys

Aug. 3, 1926.
H. W. TINKER
1,594,580
BUMPER STRUCTURE FOR VEHICLES
Filed Nov. 6, 1925      2 Sheets-Sheet 2
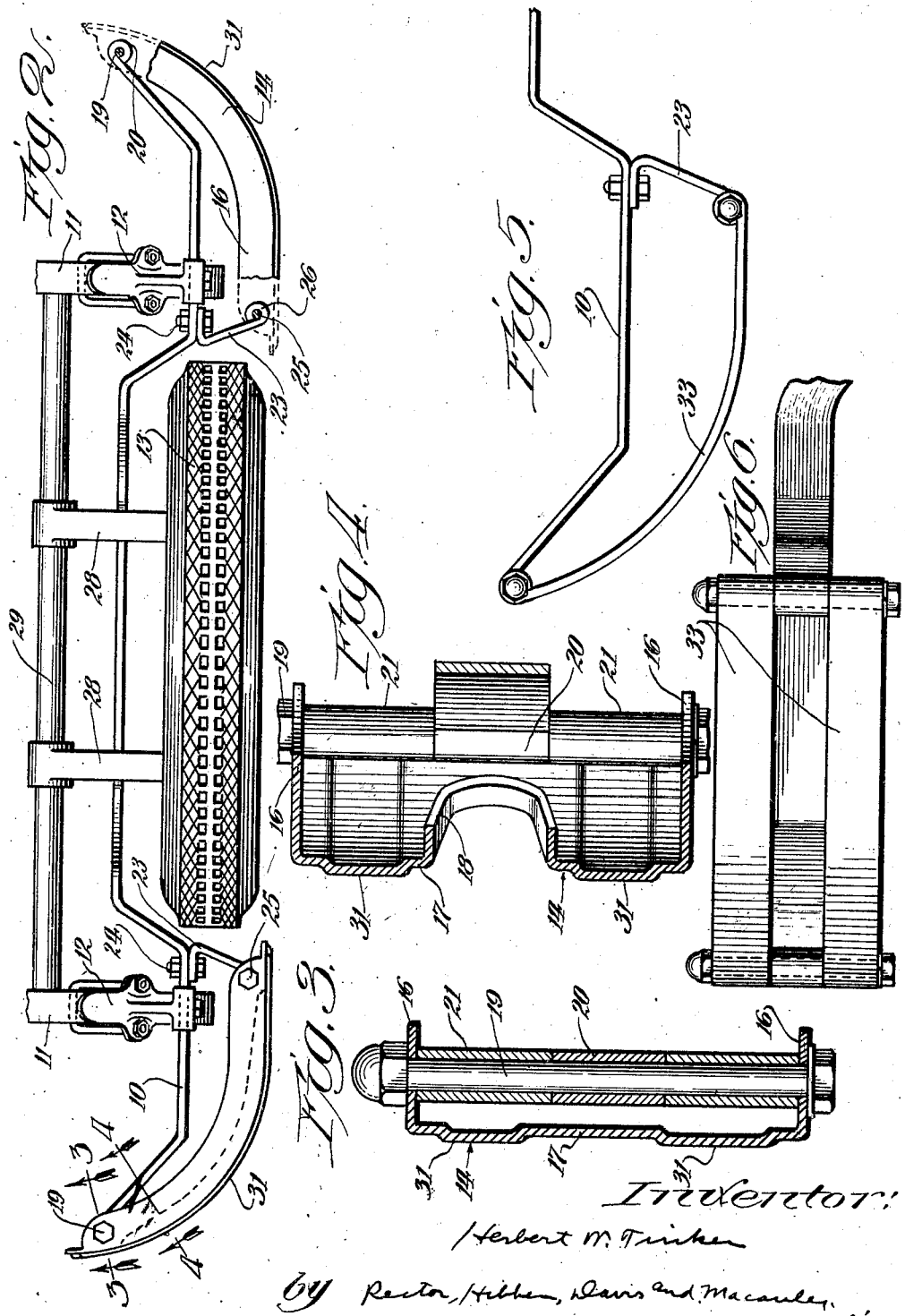

Patented Aug. 3, 1926.

1,594,580

UNITED STATES PATENT OFFICE.

HERBERT W. TINKER, OF MILWAUKEE, WISCONSIN, ASSIGNOR TO FEDERAL PRESSED STEEL COMPANY, OF MILWAUKEE, WISCONSIN, A CORPORATION OF WISCONSIN.

BUMPER STRUCTURE FOR VEHICLES.

Application filed November 6, 1925. Serial No. 67,203.

My invention relates to bumper devices for vehicles, and more particularly to that class generally known as fender guards, in which the impact members at the rear of the vehicle are spaced apart to accommodate a spare tire therebetween.

One of the principal objects of my invention is to so form the spring bar, carrying the impact members and adapted to absorb or cushion any shock or blow imparted to the impact members, as to accommodate the spare tire and the means suporting the spare tire carrier. To this end I make the bar a continuous one and shape it so that its central portion is offset forwardly of its end portions to accommodate the spare tire and also is offset vertically with respect to its ends to accommodate the brackets or other supporting means for the spare tire carrier.

Another object of my invention is to provide the face or web portion of the channel-shaped sheet-metal impact bar with one or more longitudinally extending pressed-out ribs of substantial width, though preferably of little depth, to improve the appearance of the bumper structure, strengthen the impact bar, and also permit the outer faces of the ribs to be nickel-plated more cheaply, easily and perfectly, and the remainder of the impact bar to be enamelled more cheaply, easily and perfectly.

The above and further incidental objects and advantages of my improved bumper structure will become apparent from the following description, taken in conjunction with the accompanying drawings.

In said drawings, Figure 1 is a rear elevation of an automobile shown equipped with fender guards embodying my invention; Fig. 2 is a top plan view showing the fender guards and the spare tire mounted on the rear end of the chassis; Fig. 3 is a cross sectional view taken through one of the fender guards as on the line 3—3 of Fig. 2; Fig. 4 is likewise a cross-sectional view through the same fender guards but is taken on the line 4—4 of Fig. 2; and Figs. 5 and 6 are top plan and rear elevations, respectively, of one end of the spring supporting bar and of one of the fender guards having parallel spring impact bars, instead of the rigid impact bars shown in the other figures.

It will be observed by referring to Figs. 1 and 3 that a continuous bar 10 formed of spring metal, extends transversely across the rear end of the vehicle and is connected to the rear projecting ends of the side sills 11 of the chassis by means of clamps or brackets 12 which may be of any approved or desired form. Mounted on this spring supporting bar and to both sides of the spare tire 13 are the impact members 14. Each of these impact members consists of a sheet metal bar pressed in dies to form rearwardly extending flanges 16 at the upper and lower edges of its web or face 17 which is provided with a flanged opening 18. While I have shown but one opening 18 it will be obvious that more than one opening may be provided if desired.

The outer forward end of each impact bar 14 is connected to the outer corresponding end of the spring supporting bar 10 by means of a bolt 19 (Fig. 3) which projects through holes in the flanges 16 and through an integral rolled eye 20 formed on the extreme end of the bar 10, suitable spacing collars 21 being positioned between the eye 20 and the flanges 16, in order to hold the impact bar in position on the spring bar 10. The opposite or inner end of each impact bar 14 is connected to the spring bar 10 just within the bracket 12 by means of an arm 23 (Fig. 2) which is also preferably formed of spring metal and is secured to the bar 10 by means of a bolt 24. The forward end of the arm 23 is connected to the inner end of the impact bar by means of a bolt 25 which extends through the flanges 16, spacing collars, like collars 21, and an eye 26 integrally formed on the forward end of the arm 23. It will be observed that the outer ends of the spring supporting bar 10 are inclined forwardly so that the impact bars 14 may have the desired curvature and yet not be spaced an inordinate distance from the rear end of the chassis.

The tire carrier 27 (Fig. 1) may of itself be of any desired construction and I have shown it in the form of a continuous ring or rim supported by means of projecting arms 28 connected at their forward ends to a cross bar 29 on the chassis.

When the spare tire is mounted on the tire carrier 27 its rear face is substantially in the same plane as the straight inner ends of the faces of the impact members 14. In order that the tire shall not project rearwardly beyond the impact members, the central portion of the bar 10 is offset or bent forwardly to afford a deeper space for reception of the tire. By referring to Fig. 1 it will be noted that the central portion 30 of the bar is also offset vertically with respect to its ends in order to accommodate the two supporting arms 28 for the tire carrier, the forward portions of these arms being in the same horizontal plane as the end portions of the bar 10. This feature is important, as it permits the use of the fender guards on any automobile even when the tire carrier supporting means is in the same horizontal plane as the medium line through the impact members, as the central portion of the spring carrying bar 10 is then offset, either downwardly or upwardly, to accommodate the tire carrier supporting means.

It will be noted that the web or face of each impact member is provided with pressed-out parallel ribs 31, which preferably extend from one end to the other of the impact member and which are of substantial width, though of relatively little depth. The ribs give the impact bar a very much improved appearance and at the same time strengthen it. It is often desirable and preferable to finish the impact members with an enamel, for example, black enamel, and nickel combination. Another decided advantage of the ribs is that they may be nickel-plated on their outer faces very readily and at little cost, the remainder of the faces being enamelled. This finishing may be accomplished by first nickel-plating the entire piece which forms the bar. Gummed paper may then be pasted over the ribs 31 after which the entire bar is sprayed with the enamel. The gummed paper is then removed and the ribs polished. If the faces were not ribbed as shown, great difficulty would be experienced in providing a neat line of demarcation between the enamelled and nickel surfaces. The nickeling and enamelling might be accomplished, in some cases, by hand without providing the structure which I employ, but that would be very costly; and, in any event, if the ribs were not provided there would always be a tendency for the enamel to run into the nickled portion. The ribs 31 provide against this and facilitate the operation from every standpoint.

Referring to Figs. 5 and 6, it will be noted that the impact members differ from the channel-shaped impact member shown in the other views. In Figs. 5 and 6, the fender guard at each end is provided with two parallel impact strips 33 formed of spring metal, the impact members being connected to the spring impact bars 10 by the same means as shown in the other figures, namely by means of bolts extending through eyes in the ends of the supporting bar 10 and the arms 23, eyes being formed in the ends of the impact strips 33 for reception of the bolts.

I claim:

1. In combination with a spare tire carrier means, of a fender guard structure comprising impact members spaced apart to accommodate the spare tire, and a supporting bar having its end portions connected to said impact members and a central portion offset laterally with respect to its end portions to accommodate the spare tire and offset vertically with respect to its end portions to accommodate said spare tire carrier means.

2. In combination with a spare tire carrier and means projecting rearwardly from the vehicle chassis for supporting said carrier, of a fender guard structure comprising impact members spaced apart to accommodate the spare tire, a spring supporting bar adapted to extend across the rear end of the vehicle chassis with its end portions connected to said impact member and in the same horizontal plane as said tire carrier supporting means, and having a central portion laterally forwardly offset with respect to its end portions to accommodate the spare tire and vertically downwardly offset with respect to its end portions to accommodate said tire carrier supporting means.

3. In a fender guard structure, the combination of two impact members spaced apart to accommodate a spare tire therebetween, a spring supporting bar having its central portion offset vertically with respect to its end portions forwardly of the space between said impact members, and means for connecting said impact members to the end portions of said bar.

4. In a fender guard structure, the combination of two impact members spaced apart to accommodate a spare tire therebetween, a spring supporting bar having a laterally forwardly offset and a vertically offset central portion forwardly of the space between said impact members, and means for connecting said impact members to the end portions of said bar.

5. In a fender guard structure, the combination of a continuous spring supporting bar having forwardly inclined ends and a central portion offset forwardly and offset downwardly with respect to its end portions, brackets for supporting said bar and connected to the same between said inclined ends and central portions, impact members having their outer ends secured directly to the ends of said spring bar, and spring arms connecting the opposite or inner ends of said impact members to said spring bar adjacent said brackets.

6. In a bumper structure, an impact member formed of sheet metal and channel-shaped in cross-section, with flanges at the upper and lower edges of its web or face, and longitudinal ribs of substantial width pressed outwardly in the web or face of the member.

7. In a sheet metal impact bar for a bumper structure, a web, integral extending flanges at the edges of said web, a flanged opening in said web, and parallel pressed-out shallow ribs of substantial width formed in said web and extending longitudinally of the bar on each side of said opening.

8. In a bumper structure, a sheet metal impact member having a web, integral extending flanges at the edges of said web, and a pressed-out shallow nickel-plated rib of substantial width formed in said web and extending longitudinally of the member.

9. In a bumper structure, an impact section formed of sheet-metal having two longitudinally extending portions with an elongated opening therebetween and laterally extending horizontal flanges, and longitudinally parallel pressed-out flat shallow ribs of substantial width formed in the faces of said two longitudinally extending portions.

10. In a bumper structure, an impact section formed of sheet-metal having two longitudinally extending portions with an elongated opening therebetween and laterally extending horizontal flanges, and longitudinally extending parallel pressed-out shallow ribs of substantial width and shallower than the thickness of the metal formed in the faces of said two longitudinally extending portions and having their faces nickel-plated.

In testimony whereof, I have subscribed my name.

HERBERT W. TINKER.